United States Patent [19]

Angehrn et al.

[11] Patent Number: 4,711,122
[45] Date of Patent: Dec. 8, 1987

[54] FLEXIBLE MUD EXCLUDER FOR BOREHOLE TELEVIEWER

[75] Inventors: Jorg A. Angehrn, Brea; Dennis J. Fischer, Walnut Creek, both of Calif.

[73] Assignee: Chevron Research Co., San Francisco, Calif.

[21] Appl. No.: 898,557

[22] Filed: Aug. 21, 1986

[51] Int. Cl.$^4$ .............................................. G01V 1/40
[52] U.S. Cl. ......................................... 73/151; 73/623; 367/69
[58] Field of Search ..................... 73/151, 623; 367/68, 367/69, 70, 71, 72, 35, 86; 358/93, 100, 106, 112

[56] References Cited

U.S. PATENT DOCUMENTS

| | | | |
|---|---|---|---|
| 3,464,513 | 9/1969 | Roever | 367/35 |
| 3,502,169 | 3/1970 | Chapman, III | 73/151 |
| 3,550,075 | 12/1970 | Hilchie et al. | 73/623 X |
| 3,596,582 | 8/1971 | Sayer | 73/151 X |
| 3,668,619 | 6/1972 | Dennis | 367/72 X |
| 4,382,290 | 5/1983 | Hauira | 367/35 |
| 4,524,324 | 6/1985 | Dickinson, III | 73/151 X |

Primary Examiner—Stewart J. Levy
Assistant Examiner—Scott M. Oldham
Attorney, Agent, or Firm—S. R. La Paglia; E. J. Keeling; E. A. Schaal

[57] ABSTRACT

The present invention is an improved mud excluder fitted around a rotating acoustic transducer of a borehole televiewer to exclude mud from the borehole televiewer. This mud excluder has:

(a) a flexible casing means attached to the borehole televiewer to form a fluid cavity adjacent to the rotating acoustic transducer,
(b) an acoustically transparent fluid located within the fluid cavity,
(c) an acoustic window means opposite the transducer and adjacent to the fluid cavity, and
(d) a pressure compensating means within the fluid cavity to equalize the pressure within the fluid cavity with the pressure on the outside of the flexible casing means.

7 Claims, 1 Drawing Figure

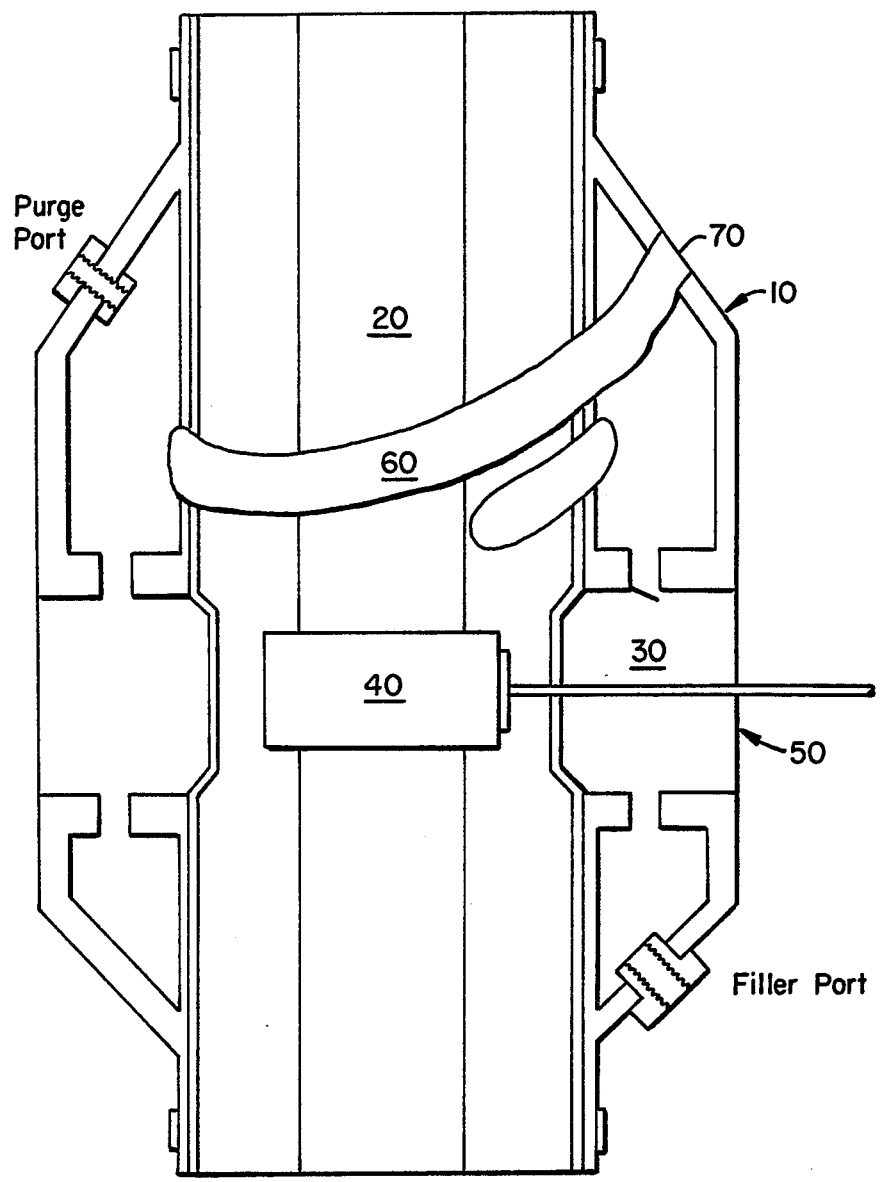

FLEXIBLE MUD EXCLUDER FOR BOREHOLE TELEVIEWER

BACKGROUND OF THE INVENTION

The borehole televiewer is a tool which records a circumferential "picture" of the borehole wall through the use of a rotating acoustic transducer. A sonic pulse fired from the transducer travels through the drilling mud until it impinges upon the borehole wall. A portion of the energy from the sonic pulse reflects off the wall and returns back to the transducer via the same path. This energy produces a voltage that is amplified, sent up-hole, and is recorded. A circumferential plot is produced at the surface by amplitude modulating the recorded voltages.

The purpose of a mud excluder is to shorten the distance the sonic pulse must travel through the drilling mud, since the mud is a dispersing medium which scatters the energy from the sonic pulse and ultimately contributes to decreased resolution of the televiewer. A conventional mud excluder is a rigid device machined from two pieces of brass. A rubber boot is fitted between the two parts to form a "window" for the pulse to pass through. Brine forms the transmission medium for the sonic pulse. Shear pins are fitted to the mud excluder to release it under the application of about 1000 lbs. static force in the event the excluder encounters an obstruction.

Since conventional mud excluders are rigid, and since any constrictions in the hole will shear them off, their outer diameters must be kept small with respect to the borehole diameter. This small outer diameter means that the travel path of the sonic pulse through the mud is longer than it would be if the outer diameter was larger. The net result of the small outer diameter is decreased resolution.

Since conventional mud excluders are not pressure-compensated, some deformation occurs in the rubber boot window. This deformation reduces the effectiveness of the mud excluder in two ways. First, the deformation increases the travel path of the sonic pulse through the mud. Second, since the window tends not to deform uniaxially, the pulse may impinge upon the window non-perpendicularly, causing some reflection of the signal.

SUMMARY OF THE INVENTION

The present invention is an improved mud excluder fitted around a rotating acoustic transducer of a borehole televiewer that is flexible and is pressure-compensated. This mud excluder comprises:

(a) a flexible casing means attached to the borehole televiewer to form a fluid cavity adjacent to the rotating acoustic transducer, (b) an acoustically transparent fluid located within the fluid cavity, (c) an acoustic window means opposite the transducer and adjacent to the fluid cavity, and (d) a pressure compensating means within the fluid cavity to equalize the pressure within the fluid cavity with the pressure on the outside of the flexible casing means.

The advantages of this mud excluder are many. It is less expensive to manufacture than conventional mud excluders. It is less cumbersome to use. It is more tolerant of restrictions within the borehole. It has no bulky metal pieces to be lost in the borehole when the tool runs into a hole restriction. Its window means has no deformation of the due to pressure differential.

BRIEF DESCRIPTION OF THE DRAWING

The drawing is a side elevation of one embodiment of the present invention.

DESCRIPTION OF THE PREFERRED EMBODIMENTS

In its broadest application, the present invention is a flexible mud excluder having four elements:
(a) a flexible casing means,
(b) an acoustically transparent fluid,
(c) an acoustic window means, and
(d) a pressure compensating means.

FIG. 1 shows one embodiment of the present invention. A flexible casing means 10 molded from synthetic rubber is attached to a borehole televiewer 20 to form a fluid cavity 30 adjacent to the rotating acoustic transducer 40. Brine is located within the fluid cavity 30. An acoustic window means 50 made of a vulcanized synthetic rubber is opposite the transducer 40 and is adjacent to the fluid cavity 30. A pressure compensating means 60 is located within the fluid cavity 30 to equalize the pressure within the fluid cavity with the pressure on the outside of the flexible casing means. The pressure compensating means comprises a bladder made of rubber tubing located between the flexible casing means 10 and the borehole televiewer 20. The bladder is externally open to the mud at opening 70.

Preferably, the flexible casing means is molded from a synthetic rubber, the acoustically transparent fluid is brine, the window means is made of a vulcanized synthetic rubber, and the pressure compensating means is a bladder located between the flexible casing means and the borehole televiewer. This bladder is externally open to the mud and is preferably made of rubber tubing.

The first element of the present invention is a flexible casing means that is attached to the borehole televiewer to form a fluid cavity adjacent to the rotating acoustic transducer. Unlike the rigid casing means of conventional mud excluders, the casing means of the present invention is flexible. By "flexible", we mean "characterized by ready capability for modification or change." When a conventional mud excluder meets a narrow restriction within the borehole, it cannot pass that restriction. On the other hand, when the mud excluder of the present invention meets the same restriction, it can deform to a smaller size until it passes through the restriction, then it can reform to its original size. Thus, the mud excluder of the present invention is more tolerant of borehole restrictions. A major advantage of using a flexible casing means is that, since the flexible casing means is more tolerant of borehole restrictions, its outer diameter can be larger. This means that the travel path of the sonic pulse through the mud is shorter and the resolution is better.

Preferably, this flexible casing means is made of a synthetic rubber. More preferably, this flexible casing means is molded from the synthetic rubber. One such synthetic rubber that can be used is derived from the combination of vinylidene fluoride and hexafluoropropylene. A mud excluder molded from synthetic rubber would be less expensive to manufacture than conventional mud excluders. Also, a mud excluder molded from synthetic rubber would not leave bulky metal pieces in the borehole if it runs into a hole restriction that it cannot pass.

The second element of the present invention is an acoustically transparent fluid located within the fluid cavity. By "acoustically transparent", we mean "having the property of transmitting sound without appreciable scattering." This fluid forms the transmission medium for the sonic pulse. One such acoustically transparent fluid is brine.

The third element of the present invention is an acoustic window means opposite the transducer and adjacent to the fluid cavity. By "acoustic window", we mean "an acoustically transparent barrier." This acoustic window means can be a rubber boot fitted between two parts of the flexible casing means. Preferably, the acoustic window means is made of a vulcanized synthetic rubber.

The fourth element of the present invention is a pressure compensating means within the fluid cavity to equalize the pressure within the fluid cavity with the pressure on the outside of the flexible casing means. This equalization of pressure prevents the decrease in signal resolution that would result from any deformation of the acoustic window means.

Preferably, the pressure compensating means comprises a bladder located between the flexible casing means and the borehole televiewer, wherein the bladder is externally open to the mud. In one embodiment, the bladder is made of rubber tubing.

While the mud excluder has been described with reference to particularly preferred embodiments, modifications which would be obvious to the ordinary skilled artisan are contemplated to be within the scope of this invention.

What is claimed is:

1. A mud excluder fitted around a rotating acoustic transducer of a borehole televiewer to exclude mud from said borehole televiewer, wherein said mud excluder comprises:
    (a) a flexible casing means attached to said borehole televiewer to form a fluid cavity adjacent to said rotating acoustic transducer;
    (b) an acoustically transparent fluid located within said fluid cavity;
    (c) an acoustic window means opposite said transducer and adjacent to said fluid cavity; and
    (d) a pressure compensating means within the fluid cavity to equalize the pressure within said fluid cavity with the pressure on the outside of said flexible casing means.

2. A mud excluder according to claim 1 wherein said flexible casing means is made of a synthetic rubber.

3. A mud excluder according to claim 2 wherein said flexible casing means is molded from a synthetic rubber.

4. A mud excluder according to claim 1 wherein said acoustic window means is made of a vulcanized synthetic rubber.

5. A mud excluder according to claim 1 wherein said pressure compensating means comprises a bladder located between the flexible casing means and the borehole televiewer, wherein said bladder is externally open to the mud.

6. A mud excluder according to claim 5 wherein said bladder is made of rubber tubing.

7. A mud excluder fitted around a rotating acoustic transducer of a borehole televiewer, wherein said mud excluder comprises:
    (a) a flexible casing means attached to said borehole televiewer to form a fluid cavity adjacent to said rotating acoustic transducer, wherein said flexible casing means is molded from a synthetic rubber;
    (b) brine located within said fluid cavity;
    (c) an acoustic window means opposite said transducer and adjacent to said fluid cavity, wherein said acoustic window means is made of a vulcanized synthetic rubber; and
    (d) a pressure compensating means within the fluid cavity to equalize the pressure within said fluid cavity with the pressure on the outside of said flexible casing means, wherein said pressure compensating means comprises a bladder located between the flexible casing means and the borehole televiewer, wherein said bladder is externally open to the mud, and wherein said bladder is made of rubber tubing.

* * * * *